United States Patent
Kim

(10) Patent No.: US 12,271,235 B2
(45) Date of Patent: Apr. 8, 2025

(54) COVER OF ELECTRONIC DEVICE AND ELECTRONIC DEVICE COMPRISING COVER

(71) Applicant: SAMSUNG ELECTRONICS CO., LTD., Suwon-si (KR)

(72) Inventor: Sanggook Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 228 days.

(21) Appl. No.: 17/946,779

(22) Filed: Sep. 16, 2022

(65) Prior Publication Data

US 2023/0099983 A1    Mar. 30, 2023

Related U.S. Application Data

(63) Continuation of application No. PCT/KR2022/011045, filed on Jul. 27, 2022.

(30) Foreign Application Priority Data

Sep. 27, 2021  (KR) .................. 10-2021-0127106

(51) Int. Cl.
*G06F 1/16*   (2006.01)
*G06F 3/0354*   (2013.01)

(52) U.S. Cl.
CPC .......... *G06F 1/1656* (2013.01); *G06F 1/1681* (2013.01); *G06F 3/03545* (2013.01); *G06F 1/1652* (2013.01)

(58) Field of Classification Search
CPC .. G06F 1/1656; G06F 1/1681; G06F 3/03545; G06F 1/1652; G06F 1/1607; B43K 23/00
See application file for complete search history.

(56) References Cited

U.S. PATENT DOCUMENTS 7,434,774 B1 * 10/2008 Floersch ............ F16M 11/2014
                                                      248/923
7,865,151 B2 *  1/2011 Cho .................... H04M 1/0227
                                                      455/90.3
(Continued)

FOREIGN PATENT DOCUMENTS

CN     108806510 A    11/2018
KR     200461376 Y1    7/2012
(Continued)

OTHER PUBLICATIONS

International Search Report and Written Opinion for International Application No. PCT/KR2022/011045; International Filing Date Jul. 27, 2022; Date of Mailing Jan. 11, 2022; 9 Pages.

*Primary Examiner* — Rockshana D Chowdhury
*Assistant Examiner* — Martin Antonio Asmat Uceda
(74) *Attorney, Agent, or Firm* — CANTOR COLBURN LLP

(57) ABSTRACT

An electronic device cover may include a first cover portion, a second cover portion formed to be movable relative to the first cover portion, a hinge assembly disposed on one surface of the second cover portion, and a holder rotatably coupled to the hinge assembly. The holder has a first end and a second end and a rotation center of the holder may be disposed between both ends of the holder, and the holder may be formed to rotate in a plane parallel with the surface of the second cover.

10 Claims, 11 Drawing Sheets

(56) References Cited

U.S. PATENT DOCUMENTS

| | | | | |
|---|---|---|---|---|
| 9,063,693 | B2* | 6/2015 | Raken | G06F 1/1656 |
| 10,110,269 | B2* | 10/2018 | Nyholm | H04M 1/21 |
| 10,136,714 | B2* | 11/2018 | Marks | G06F 1/1628 |
| 10,177,804 | B2* | 1/2019 | Hill | A45C 13/1069 |
| 10,817,082 | B1 | 10/2020 | Yildiz et al. | |
| 11,797,056 | B2* | 10/2023 | Elsey | G06F 3/03545 |
| 2012/0103855 | A1* | 5/2012 | Gaddis, II | A45C 13/1069 |
| | | | | 361/679.01 |
| 2015/0237979 | A1* | 8/2015 | Huang | G06F 1/1628 |
| | | | | 206/45.25 |
| 2018/0323818 | A1 | 11/2018 | Hill | |
| 2020/0266383 | A1 | 8/2020 | Li | |
| 2020/0363837 | A1* | 11/2020 | Park | A45C 11/00 |
| 2021/0005368 | A1* | 1/2021 | Breiwa | F16M 13/022 |
| 2021/0037666 | A1 | 2/2021 | Kang et al. | |
| 2022/0137664 | A1* | 5/2022 | Sugiyama | G06F 1/1607 |
| | | | | 361/679.27 |
| 2023/0037484 | A1* | 2/2023 | Kang | H04B 1/3888 |

FOREIGN PATENT DOCUMENTS

| | | |
|---|---|---|
| KR | 200468007 Y1 | 7/2013 |
| KR | 20140007049 A | 1/2014 |
| KR | 20140005922 U | 11/2014 |
| KR | 20150001868 U | 5/2015 |
| KR | 20210016236 A | 2/2021 |
| KR | 20220013128 A | 2/2022 |
| KR | 20230022006 A | 2/2023 |
| WO | 2013147376 A1 | 10/2013 |

\* cited by examiner

COVER OF ELECTRONIC DEVICE AND ELECTRONIC DEVICE COMPRISING COVER

CROSS-REFERENCE TO RELATED APPLICATION(S)

This application is based on and claims priority under 35 U.S.C. § 120 to PCT International Application No. PCT/KR2022/011045, which was filed on Jul. 27, 2022, and claims priority to Korean Patent Application No. 10-2021-0127106, filed on Sep. 27, 2021, in the Korean Intellectual Property Office, the disclosure of which are incorporated by reference herein their entirety.

BACKGROUND

Technical Field

The disclosure relates to a cover of an electronic device.

Description of Related Art

Various electronic devices have been provided to users, and electronic devices that allow users to access various types of content while carrying them, such as mobile phones and e-books, have been widely used. Various functions such as photos, music, video, multimedia, games, and so on as well as a wireless transmission/reception function are integrated into an electronic device. A display unit is provided on the front surface of the electronic device so that the multi-functions as described above may be used. In the case of a recent electronic device called a smart phone, a large-sized display unit sensitive to a touch is provided across the entire front surface of the electronic device.

Along with the trend of miniaturization and lightweight, a user carries an electronic device by hand or keeps it in a pocket or bag, and uses it while moving. However, there is a risk of loss or damage in storing and carrying the electronic device. To safely protect the electronic device, various types of covers are used.

To improve use convenience of the user, the user may be allowed to apply an input to the electronic device with another tool instead of a touch. A pen may be an example of the tool. The pen may transmit an input signal to the electronic device through physical contact or wireless communication with the electronic device.

SUMMARY

An electronic device cover according to various embodiments of the disclosure may include a first cover portion, a second cover portion formed to be movable relative to the first cover portion, a hinge assembly disposed on one surface of the second cover portion, and a holder rotatably coupled to the hinge assembly. The rotation center of the holder may be disposed between both ends of the holder, and the holder may be formed to rotate in a plane parallel with the surface of the second cover portion.

An electronic device including a first housing, a second housing, a hinge, and a display disposed across the first housing, the second housing, and the hinge according to various embodiments of the disclosure may be coupled with an electronic device cover. The electronic device cover may include a first cover portion coupled with the first housing, a second cover portion coupled with the second housing and formed to be movable relative to the first cover portion, a hinge assembly disposed on one surface of the second cover portion, and a holder rotatably coupled to the hinge assembly. A rotation center of the holder may be disposed between both ends of the holder, and the holder may be formed to rotate in a plane parallel with the surface of the second cover portion.

An electronic device cover according to various embodiments of the disclosure may include a hinge assembly disposed on one surface of the electronic device cover, and a holder rotatably coupled to the hinge assembly. A rotation center of the holder may be disposed between both ends of the holder, and the holder may be formed to rotate in a plane parallel with the surface of the electronic device cover.

DETAILED DESCRIPTION

Figure 1:
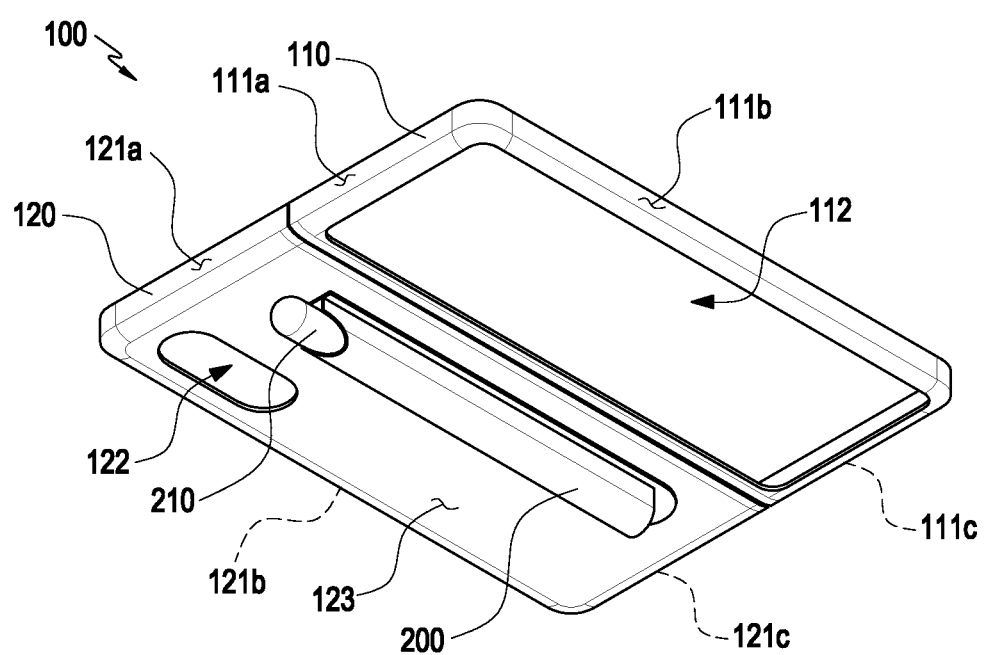
FIG. 1 is a perspective view illustrating the rear surface of an electronic device cover according to various embodiments of the disclosure.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

FIG. 1 is a perspective view illustrating the rear surface of an electronic device cover according to various embodiments of the disclosure.

FIG. 1 illustrates a cover 100 of an electronic device (e.g., an electronic device 510 of FIG. 7A or an electronic device 520 of FIG. 7B) and a holder 200 disposed on a rear surface 123 of the cover 100. The electronic device may be a mobile phone, tablet, or other mobile or handheld electronic device.

Figure 7A:
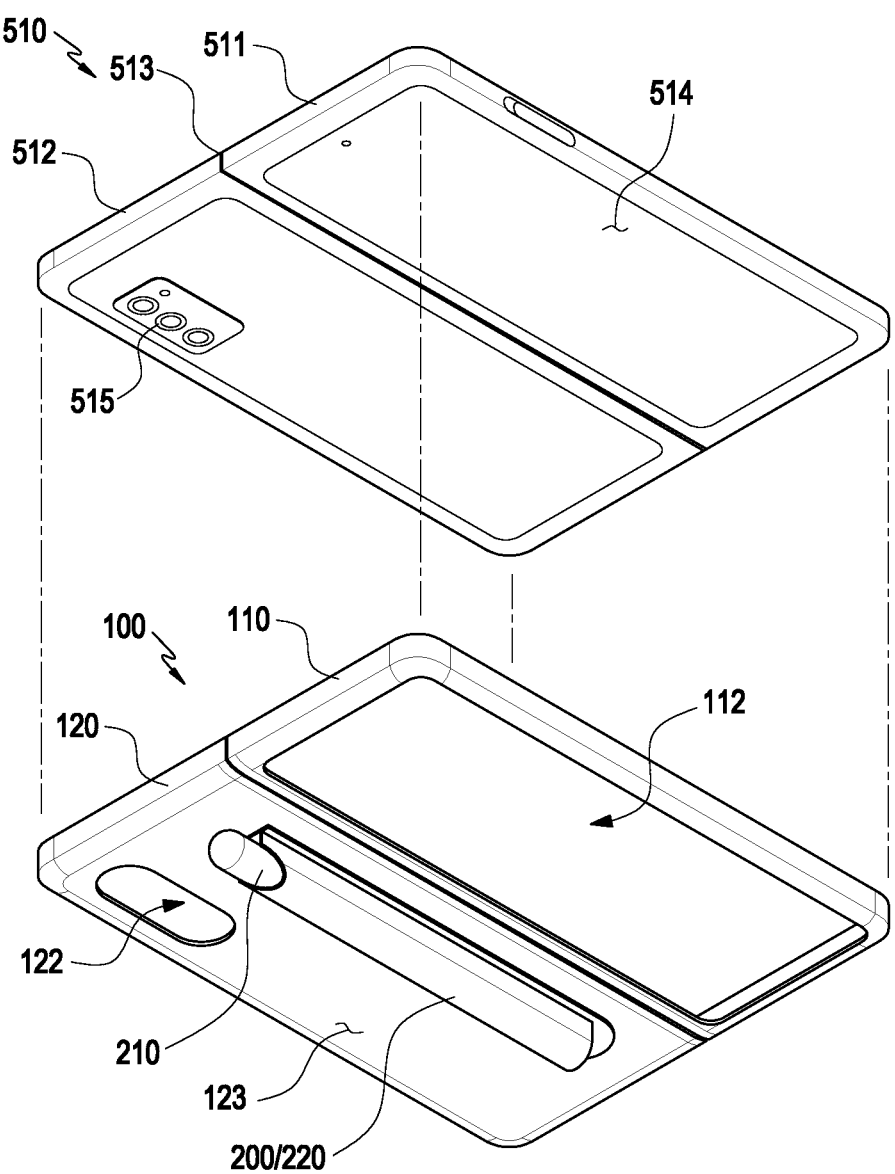
FIG. 7A is a perspective view illustrating a cover and a foldable electronic device according to various embodiments of the disclosure.
Figure 7B:
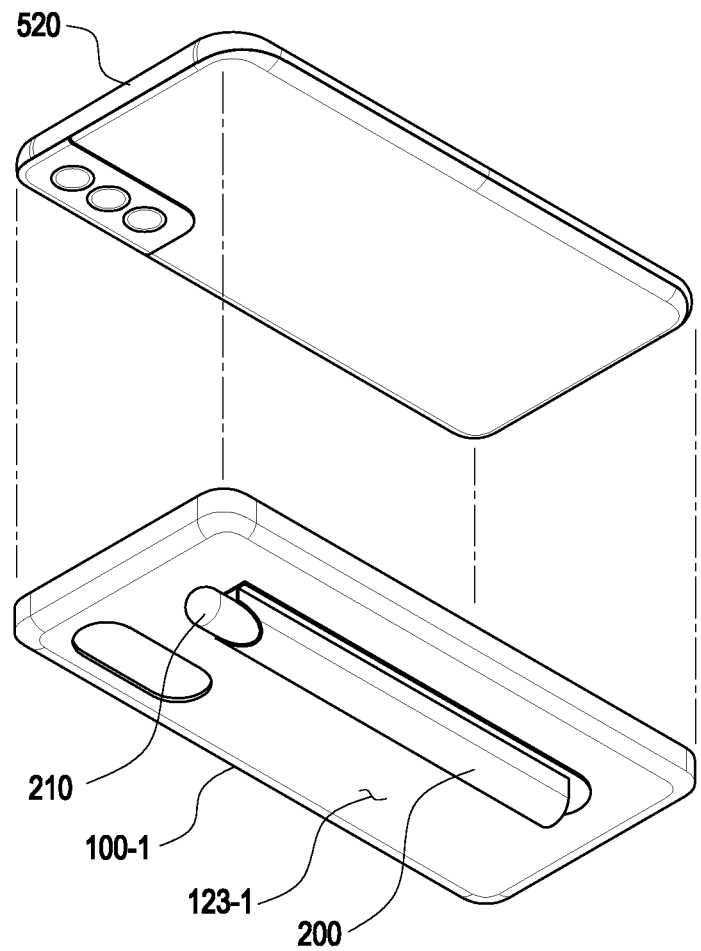
FIG. 7B is a perspective view illustrating a cover and an electronic device according to various embodiments of the disclosure.

According to various embodiments, the cover 100 may be formed to surround the outer surface of the electronic device (e.g., as shown with respect to electronic devices 510 or 520 of FIGS. 7A, 7B). The cover 100 may include a first cover portion 110 and a second cover portion 120. As described herein, the first cover portion 110 and the second cover portion 120 may be connected or attached in a manner that allows for relative movement or rotation between the first cover portion 110 and the second cover portion 120.

According to various embodiments, the first cover portion 110 may be disposed adjacent to the second cover portion 120, and configured to be coupled to or separated from the second cover portion 120. According to an embodiment, the first cover portion 110 may be disposed to the left of the second cover portion 120 (e.g., as viewed in the hands of a user), and the second cover portion 120 may be disposed to the right of the first cover portion 110. According to another embodiment, the first cover portion 110 may be disposed to the right of the second cover portion 120 (e.g., as viewed in the hands of a user), and the second cover portion 120 may be disposed to the left of the first cover portion 110.

According to various embodiments, the first cover portion 110 may include a first top surface 111a, a first side surface 111b, a first bottom surface 111c, and a first opening 112. Similarly, in this illustrative embodiment, the second cover portion 120 may include a second top surface 121a, a second side surface 121b, a second bottom surface 121c, a second opening 122, and a rear surface 123.

According to various embodiments, the first cover portion 110 may include the first top surface 111a, the first side surface 111b, and the first bottom surface 111c. The first opening 112 surrounded by the first top surface 111a, the first side surface 111b, and the first bottom surface 111c may be formed in the first cover portion 110. The first opening 112 may be sized and shaped to frame a display or screen of an electronic device that is housed in the cover 100.

According to various embodiments, the second cover portion 120 may include the second top surface 121a, the second side surface 121b, the second bottom surface 121c, and the rear surface 123. The second opening 122 may be formed on or in the second rear surface 123. The second opening 122 may be sized and shaped to frame or surround a camera of an electronic device that is housed in the cover 100.

According to various embodiments, the holder 200 may be disposed on the rear surface 123 of the second cover portion 120. The holder 200 may be disposed on the rear surface 123 to accommodate or receive various components, tools, and devices. According to an embodiment, and as shown in FIG. 1, a stylus or pen 210 may be accommodated in the holder 200.

According to various embodiments, various components, tools, and devices other than the holder 200 may be disposed on the rear surface 123 of the second cover portion 120. The components, tools, and devices disposed on the rear surface 123 may be interchangeable with the holder 200. That is, the holder 200 is shown merely for illustrative and explanatory purposes, but other structures may be installed and attached to the cover 100 in accordance with embodiments of the present disclosure and as described herein. Such other structures may include, without limitation, clips, clasps, straps, suction pads, and the like.

Figure 2A:
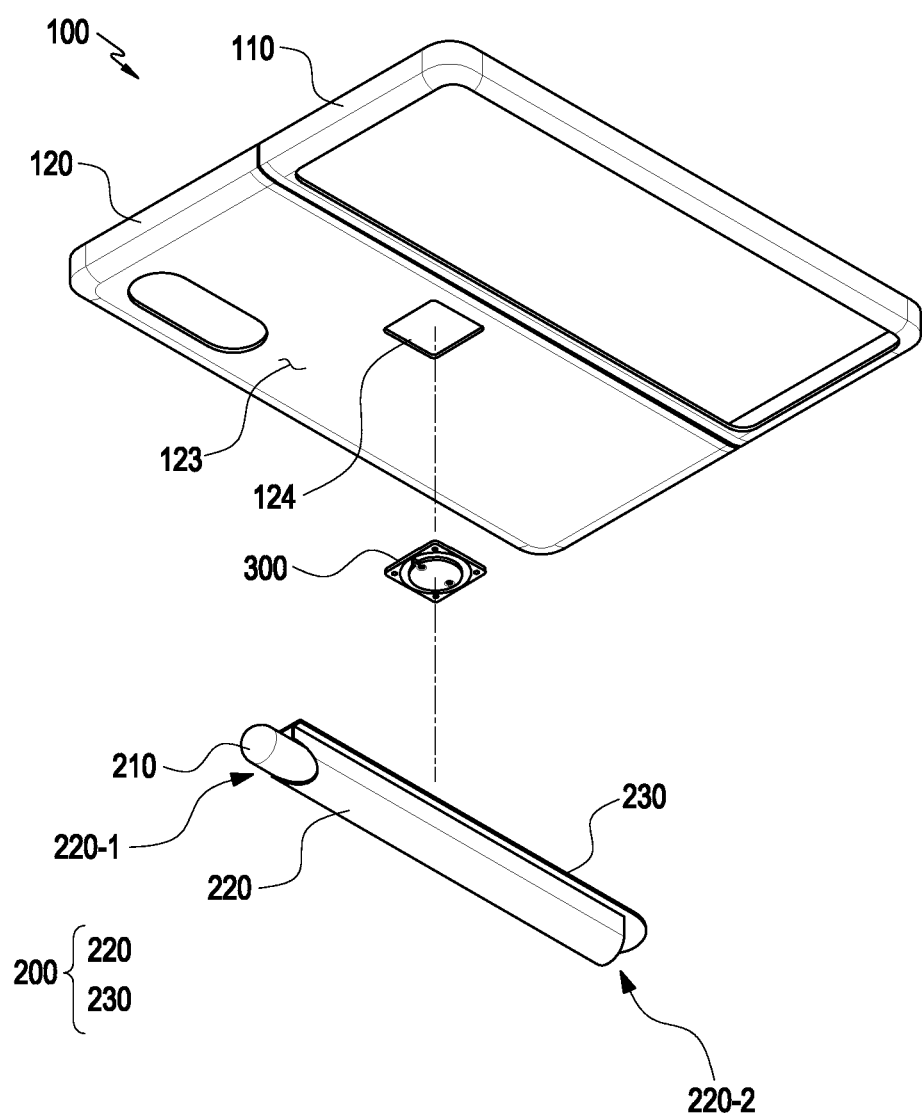
FIG. 2A is an exploded perspective view illustrating components on the rear surface of an electronic device cover according to various embodiments of the disclosure.
Figure 2B:
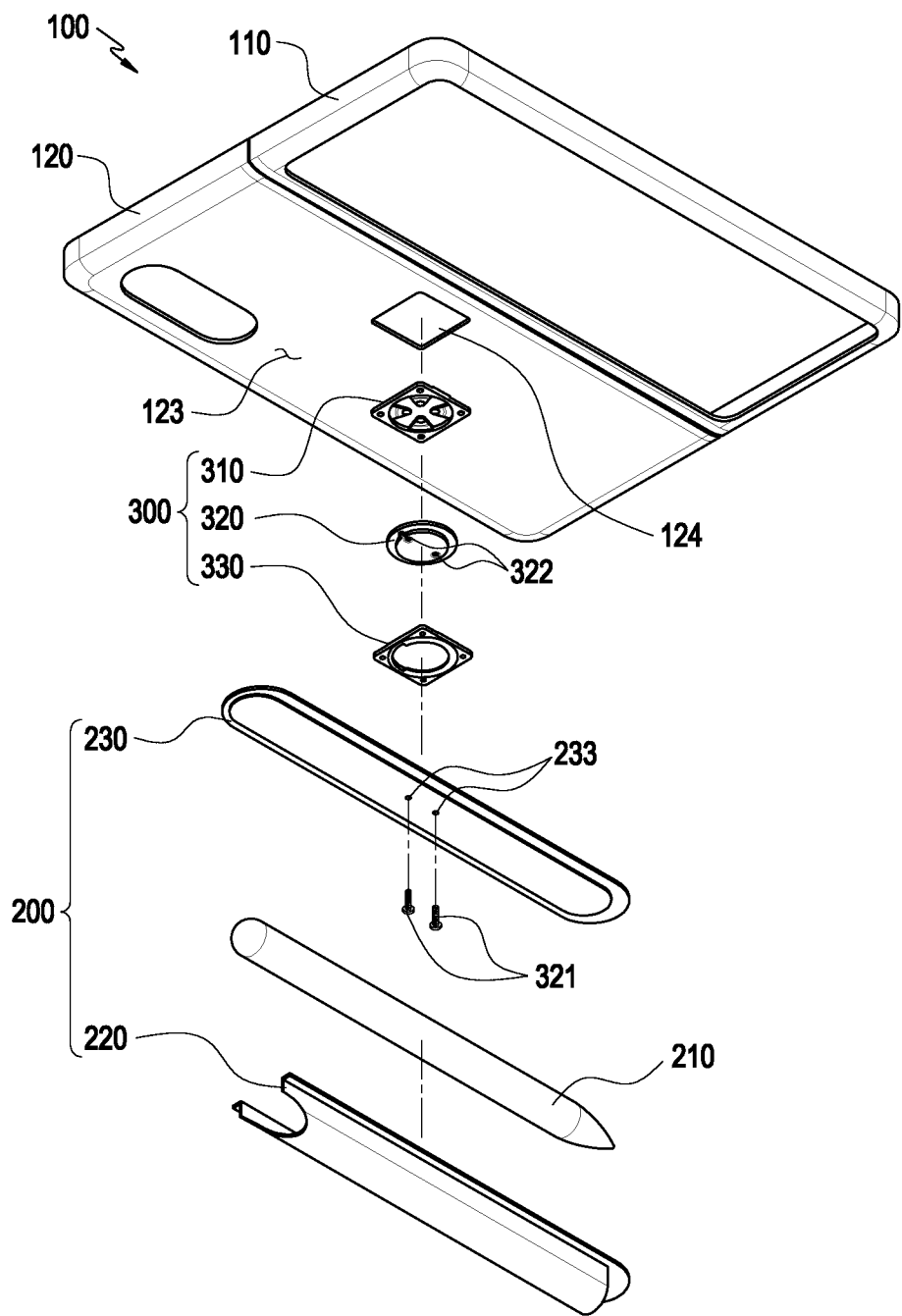
FIG. 2B is an exploded perspective view illustrating the rear surface of the electronic device cover according to various embodiments of the disclosure.

FIG. 2A is an exploded perspective view illustrating components on the rear surface of an electronic device cover according to various embodiments of the disclosure, and FIG. 2B is an exploded perspective view illustrating the rear surface of the electronic device cover according to various embodiments of the disclosure.

The cover 100 (formed of the first cover portion 110 and the second cover portion 120), the holder 200, and the pen 210 illustrated in FIGS. 2A and 2B may be identical or similar to the cover 100, the first cover portion 110, the second cover portion 120, the holder 200, and the pen 210 illustrated in FIG. 1, and thus a redundant description of the same components may be avoided.

Referring to FIG. 2A, according to various embodiments, the holder 200 and a hinge assembly 300 may be attached or disposed on the cover 100 (illustrated as separate in this view).

According to various embodiments, a hinge groove 124 may be formed on the rear surface 123 of the second cover portion 120. The hinge groove 124 may be formed in the form of a groove recessed into the rear surface 123. According to an embodiment, the shape of the hinge groove 124 may be a quadrangle. The hinge groove 124 may be formed in other shapes, not limited to the quadrangle, such as circular, triangular, polygonal, etc. or other shape. The hinge groove 124 may be formed to be coupled with the hinge assembly 300.

According to various embodiments, the hinge assembly 300 may be formed to be coupled with the hinge groove 124. The shape of the hinge assembly 300 may be a quadrangle. The hinge assembly 300 may be formed in other shapes, not limited to the quadrangle, such as circular, triangular, polygonal, etc. or other shape. The hinge assembly 300 may include various components, and at least one component included in the hinge assembly 300 may rotate with respect to the second cover portion 120. The hinge assembly 300 may be formed to be coupled with the holder 200. The holder 200 may be configured to be coupled with the at least one component configured to rotate with respect to the second cover portion 120.

According to various embodiments, at least one component included in the holder 200 may be configured to be coupled with at least one component included in the hinge assembly 300. The holder 200 may include a pouch 220 and a base fixer 230, and the pen 210 may fit within the holder 200.

According to various embodiments, the pen 210 may include an electronic component electrically communicable with an electronic device (e.g., the electronic device 510 of FIG. 7A or the electronic device 520 of FIG. 7B). The pen 210 may be configured to physically contact and/or electrically communicate with the electronic device (e.g., electronic device 510 or 520). As the pen 210 is capable of physically contacting and/or electrically communicating with the electronic device, the pen 210 and the electronic device may interact with each other. The pen 210 may be accommodated in the pouch 220 and disposed such that at least part of the pen 210 is exposed outward from the pouch 220. The exposed outward portion of the pen 210 allows for a user to interact and remove the pen 210 from the pouch 220.

According to various embodiments, the pouch 220 may be configured to accommodate the pen 210. One side of a cross-section perpendicular to a longitudinal direction of the pouch 220 may be formed to be opened. According to one embodiment, the cross-section perpendicular to the longitudinal direction of the pouch 220 may be in the shape of 'U', and the pen 210 may be accommodated in a space surrounded by the 'U' shape of the pouch 220. The cross-section of the pouch 220 may be formed into other shapes, not limited to 'U'. According to an embodiment, the cross-section of the pouch 220 may be formed in an unopened rectangular shape. In some embodiments, the cross-sectional shape of the pouch may be selected to accommodate a specific tool (e.g., other than a pen) and thus may not have a curved ("U") or squared cross-sectional shape. The pouch 220 may be configured to be coupled with the base fixer 230.

The pouch 220 may be formed from one or more types of materials, including rigid, semi-rigid, and/or flexible materials.

According to various embodiments, the base fixer 230 may be configured to be coupled with the pouch 220. The base fixer 230 may be disposed on one side of the pouch 220. According to an embodiment, the base fixer 230 may be disposed on the open side of the pouch 220. According to an embodiment, the pen 210 may be accommodated in the pouch 220 and/or the base fixer 230, while being surrounded by the base fixer 230 and the pouch 220. One or more base apertures 233 may be formed on the base fixer 230 to allow for coupling of the base fixer 230 with a rotor coupling member 321. The rotor coupling member 321 may be referred to as a hinge coupling member or coupling member.

Referring to FIG. 2B, according to various embodiments, the hinge assembly 300 may include a pressing member 310, a rotor 320, and a hinge cover 330.

According to various embodiments, the pressing member 310 may be formed into a shape corresponding to the shape of the hinge groove 124. The pressing member 310 may be coupled with the hinge groove 124 formed on the rear surface 123 of the second cover portion 120. According to an embodiment, the pressing member 310 may be fitted into the hinge groove 124. The mounting or attachment of the pressing member 310 in the hinge groove 124 may be by fastener, adhesive, press-fit, snap-fit, or other type of engagement or attachment mechanism. According to an embodiment, the hinge groove 124 may be disposed above an intermediate point in the longitudinal direction of the cover 100. The pressing member 310 may be configured to be coupled with the hinge cover 330. A groove may be formed inside the pressing member 310. According to an embodiment, the groove formed inside the pressing member 310 may be circular. The rotor 320 may be disposed in the groove formed inside the pressing member 310.

According to various embodiments, the rotor 320 may be disposed in the groove formed inside the pressing member 310. The rotor 320 may be formed into a shape corresponding to the shape of the groove formed inside the pressing member 310. According to an embodiment, the shape of the rotor 320 may be a circle. A rotor coupling aperture 322 may be formed in the rotor 320. According to an embodiment, at least two rotor coupling apertures 322 may be formed in the rotor 320. The rotor coupling apertures 322 formed in the rotor 320 may be configured to receive one or more respective rotor coupling members 321 for affixing the rotor 320 and the base fixer 230 together. According to an embodiment, the rotor coupling member 321 may be formed as a screw. The rotor coupling member 321 may be coupled with the base fixer 230 through the rotor coupling apertures 322 formed in the base fixer 230, so that the base fixer 230 may be coupled with the rotor 320. The rotor 320 may rotate relative to the pressing member 310. The rotor 320 may be configured to be coupled with the hinge cover 330. The rotor 320 may rotate relative to the hinge cover 330. According to an embodiment, a rotation center of the holder 200 may be disposed between a first end 220-1 and a second end 220-2 of the holder 200 in the longitudinal direction of the holder 200. The longitudinal direction of the holder 200 is defined as a direction between the first end 220-1 and the second end 220-2 of the holder 200.

According to various embodiments, the hinge cover 330 may be configured to be coupled with the rotor 320. The hinge cover 330 may be configured to cover at least part of the rotor 320. The hinge cover 330 may be configured to be coupled with the pressing member 310. As the hinge cover 330 is coupled with the pressing member 310, the rotor 320 is moveably secured between the hinge cover 330 and the pressing member 310 and the rotor 320 may rotate relative to the hinge cover 330.

According to various embodiments, the holder 200 may be formed in the shape of a clip. According to an embodiment, the clip-shaped holder 200 may be fitted in a car air vent, and the cover 100 may rotate with respect to the car air vent. That is, rather than the illustrative pen/pen holder configuration, a clip or clasp (e.g., holder 200) may be rotatably attached to the cover 100 at the hinge assembly 300.

According to various embodiments, the holder 200 may be formed as a suction pad. The holder 200 formed as the suction pad may stick to one surface of any component, and the cover 100 may rotate with respect to the component. That is, rather than the illustrative pen/pen holder configuration, a suction cup assembly or suction pad (e.g., holder 200) may be rotatably attached to the cover 100 at the hinge assembly 300. In this configuration, the relative rotation at the hinge assembly 300 allows for the cover 100 (and an electronic device therein) to be rotated relative to a position where the suction pad is attached.

According to various embodiments, the holder 200 may be formed as a hand strap. The holder 200 formed as a hand strap may be gripped by the user's hand, and the cover 100 may rotate with respect to the user's hand. That is, rather than the illustrative pen/pen holder configuration, a strap or band (e.g., holder 200) may be rotatably attached to the cover 100 at the hinge assembly 300.

Figure 3:
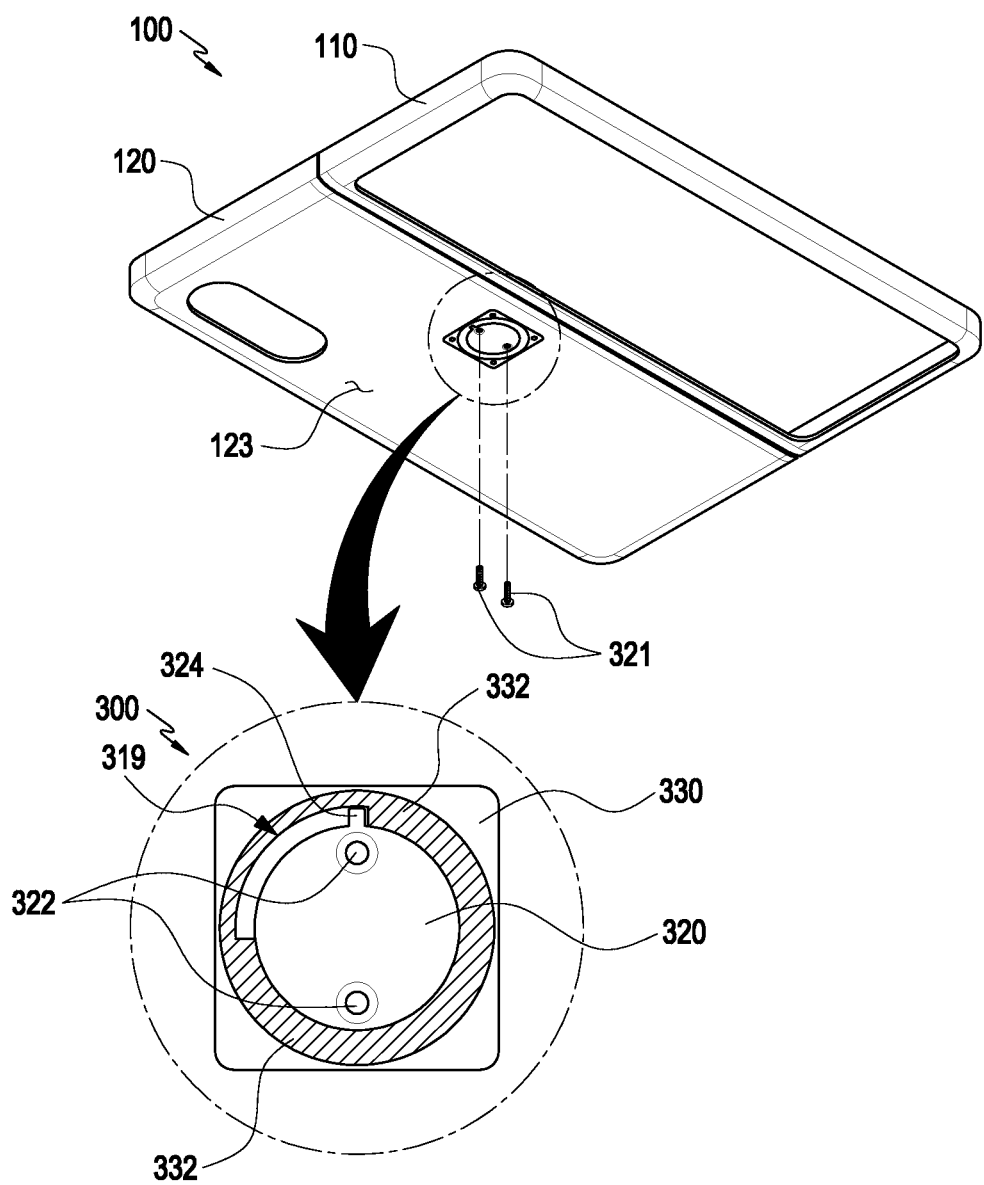
FIG. 3 is a perspective view illustrating the rear surface of a cover and an enlarged view illustrating a hinge assembly according to various embodiments of the disclosure.

FIG. 3 is a perspective view illustrating the rear surface 123 of a cover 100 and an enlarged view illustrating a hinge assembly 300 according to various embodiments of the disclosure.

The cover 100, the first cover portion 110, the second cover portion 120, the hinge assembly 300, the rotor 320, and the hinge cover 330 illustrated in FIG. 3 may be identical or similar to the cover 100, the first cover portion 110, the second cover portion 120, the hinge assembly 300, the rotor 320, and the hinge cover 330 illustrated in FIGS. 1, 2A and 2B. Accordingly, a redundant description of the same components may be avoided.

Referring to FIG. 3, according to various embodiments, the hinge assembly 300 may include the rotor 320 and the hinge cover 330.

According to various embodiments, a rotor coupling aperture 322 may be formed in the rotor 320. The rotor coupling aperture 322 formed in the rotor 320 may be configured to be coupled with the rotor coupling member 321. According to an embodiment, at least two rotor coupling apertures 322 may be formed in the rotor 320. The rotor coupling apertures 322 are configured to receive the rotor coupling member(s) 321.

According to various embodiments, a rotor protrusion 324 may be formed on the rotor 320. According to an embodiment, the rotor protrusion 324 may be formed to protrude in an outward radial direction of the rotor 320. As the rotor 320 rotates, the rotor protrusion 324 will rotate. As the rotor protrusion 324 rotates and comes into contact with a hinge rotation limiter 332 formed on the hinge cover 330, the rotation of the rotor 320 may be restricted.

According to various embodiments, the hinge rotation limiter 332 may be formed on the hinge cover 330. The hinge rotation limiter 332 may be formed in a form in which at least part of the hinge cover 330 is removed (e.g., area 319). The rotor protrusion 324 may move in the area 319 where the at least part of the hinge cover 330 is removed (e.g., a recess, channel, or groove). The rotor protrusion 324 may move in an arc according to the rotation of the rotor 320. That is, the area 319 formed in the hinge cover 330 may define an arcuate shape or path along which the rotor protrusion 324 may travel during rotation of a component (e.g., holder 200) attached to the rotor 320. As the rotor protrusion 324 comes into contact with the hinge rotation limiter 332 formed on the hinge cover 330, the rotation of the rotor 320 may be restricted. According to an embodiment, an angle between ends of the hinge rotation limiter 332 (e.g., arcuate ends of the area 319) and the rotation center of the rotor 320 may be about 90 degrees. That is, the rotation of the rotor 320 may be limited or restricted to 90 degrees of rotation. The angle between ends of the hinge rotation limiter 332 and the rotation center of the rotor 320 may be smaller or larger than about 90 degrees, and it is not intended to be limited to be about 90 degrees. According to an embodiment, the angle between the ends of hinge rotation limiter 332 and the rotation center of the rotor 320 may be about 180 degrees. That is, the rotation of the rotor 320 may be limited or restricted to 180 degrees of rotation. It will be appreciated that other angles of rotation may be employed without departing from the scope of the present disclosure.

Figure 4A:
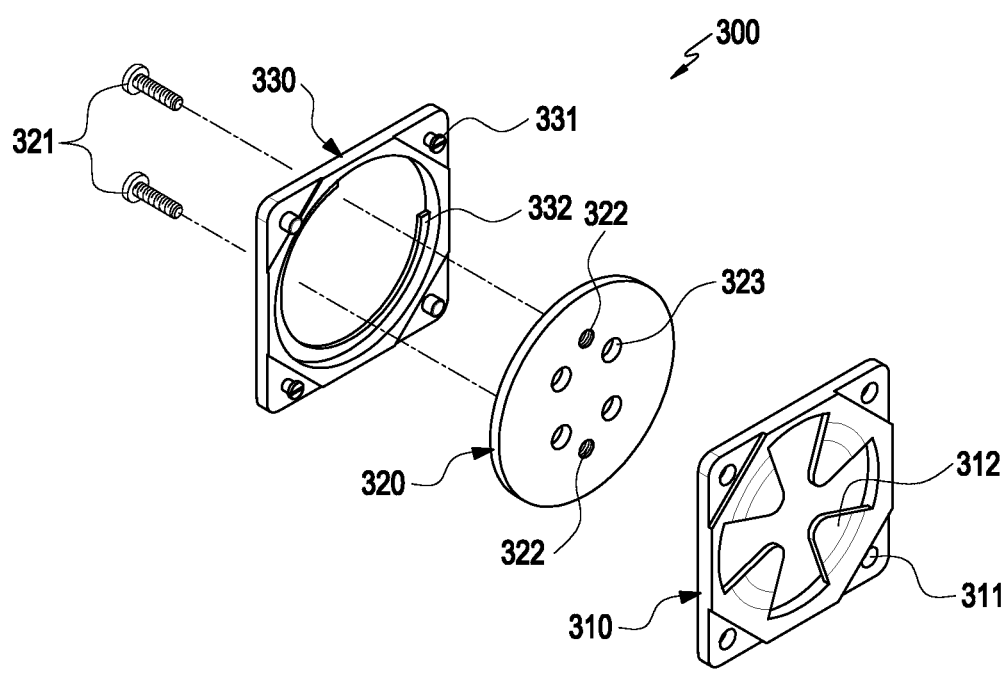
FIG. 4A is an exploded perspective view illustrating a hinge assembly viewed from a first side according to various embodiments of the disclosure.
Figure 4B:
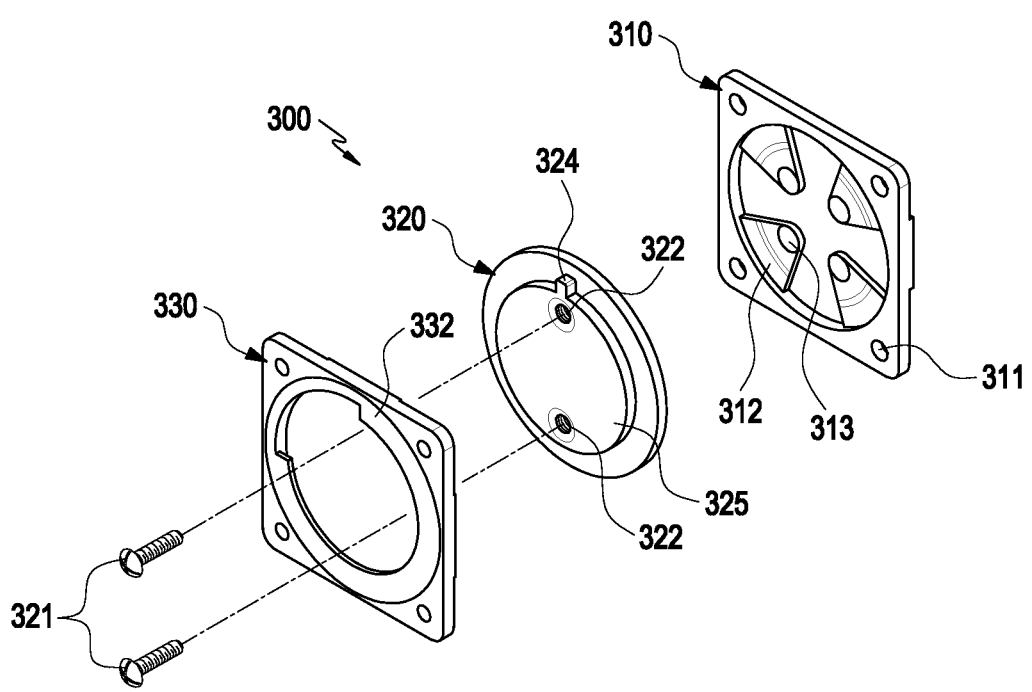
FIG. 4B is an exploded perspective view illustrating the hinge assembly viewed from a second side according to various embodiments of the disclosure.

FIG. 4A is an exploded perspective view illustrating a hinge assembly 300 viewed from one side according to various embodiments of the disclosure, and FIG. 4B is an exploded perspective view illustrating the hinge assembly 300 viewed from an opposite side according to various embodiments of the disclosure.

The pressing member 310, the rotor 320, and the hinge cover 330 illustrated in FIGS. 4A and 4B may be identical or similar to the pressing member 310, the rotor 320, and the hinge cover 330 illustrated in FIGS. 2A, 2B and 3. Accordingly, a redundant description of the same components may be avoided.

FIG. 4A is an exploded perspective view illustrating a hinge assembly 300 viewed so that the pressing member 310 is seen close, and FIG. 4B is an exploded perspective view illustrating the hinge assembly 300 viewed so that the hinge cover 330 is seen close.

Referring to FIGS. 4A and 4B, according to various embodiments, the rotor 320 may be disposed between the pressing member 310 and the hinge cover 330. According to an embodiment, at least part of the rotor 320 may be formed to be accommodated in at least part of the hinge cover 330. According to an embodiment, the pressing member 310 and the hinge cover 330 may be coupled with each other. The rotor 320 may be disposed to rotate with respect to the pressing member 310 and the hinge cover 330.

According to various embodiments, a pressing member coupling portion 311, a pressing member pressing portion 312, and a pressing member pressing protrusion 313 may be formed in the pressing member 310.

According to various embodiments, the pressing member coupling portion 311 may be formed adjacent to a corner or edge of the pressing member 310. For example, when the pressing member 310 is formed into the shape of a quadrangle, a pressing member coupling portion 311 may be positioned at one or more of the corners of the pressing member 310. The pressing member coupling portion 311 may be formed as a hole or aperture passing through the pressing member 310. The pressing member coupling portion 311 may be coupled with a hinge cover coupling portion 331 of the hinge cover 330. According to an embodiment, the hinge cover coupling portion 331, formed as a fastener, peg, tab, or the like, may be fitted into the pressing member coupling portion 311.

According to various embodiments, at least one pressing member pressing portion 312 may be formed toward the center of the pressing member 310. According to an embodiment, four pressing member pressing portions 312 may be formed in the pressing member 310. The pressing member pressing portion 312 may contact the rotor 320 to press the rotor 320 toward the hinge cover 330. The pressing member pressing protrusion 313 may be formed at one end of the pressing member pressing portion 312.

According to various embodiments, the pressing member pressing protrusion 313 may be formed at one end of the pressing member pressing portion 312. The pressing member pressing protrusion 313 may be formed on one surface of the pressing member pressing portion 312 to protrude toward the rotor 320. According to an embodiment, the pressing member pressing protrusion 313 may contact the rotor 320 to press the rotor 320 toward the hinge cover 330.

According to various embodiments, the rotor 320 may include one or more rotor coupling apertures 322, one or more rotor pressing grooves 323, and the rotor protrusion 324. Each rotor coupling aperture 322 may be configured to receive a respective rotor coupling member 321 (e.g., fastener(s) for attaching the holder 200 to the cover 100).

According to various embodiments, the rotor coupling member 321 may be coupled with the rotor coupling aperture 322 formed in the rotor 320. According to an embodiment, the rotor coupling member 321 may be coupled with the rotor 320 to fix or attach a base fixer (e.g., the base fixer 230 of FIG. 2B) and the rotor 320.

According to various embodiments, the rotor pressing groove(s) 323 may be formed on one surface of the rotor 320. According to an embodiment, the rotor pressing groove(s) 323 may be formed on one surface of the rotor 320 on which the pressing member 310 is disposed. The rotor pressing groove(s) 323 may be formed in the form of a groove in which one area is recessed. The rotor pressing groove(s) 323 may be formed into a shape corresponding to a shape of the pressing member pressing protrusion(s) 313. The rotor pressing groove(s) 323 may be formed to contact the pressing member pressing protrusion(s) 313. The pressing member pressing protrusion(s) 313 may be seated in the rotor pressing groove 323 to restrict the rotation of the rotor 320.

According to various embodiments, a rotor top plate 325 may be formed on the rotor 320. According to an embodiment, the rotor top plate 325 may be formed into the shape of a circle having a radius smaller than that of the rotor 320, on one surface of the rotor 320 (e.g., a surface facing the direction of the hinge cover 330).

According to various embodiments, the rotor protrusion 324 may be formed on the rotor 320. According to an embodiment, the rotor protrusion 324 may be formed to protrude (radially) outward from the rotor top plate 325 (e.g., in the same plane as the rotor top plate 325). The rotor protrusion 324 may be formed to contact the hinge rotation limiter 332 of the hinge cover 330. According to an embodiment, the rotor protrusion 324 may contact the hinge rotation limiter 332 to restrict the rotation of the rotor 320.

According to various embodiments, the hinge cover 330 may include the hinge cover coupling portion(s) 331 and the hinge rotation limiter 332.

According to various embodiments, the hinge cover coupling portion(s) 331 may be formed adjacent to a vertex of the hinge cover 330. According to an embodiment, the hinge cover coupling portion 331 may be formed adjacent to a vertex of the hinge cover 330 shaped into a quadrangle and formed to protrude toward the pressing member 310. The hinge cover coupling portion(s) 331 may be formed to be coupled with the pressing member coupling portion(s) 311 of the pressing member 310. The hinge cover coupling portion(s) 331 may be formed as pegs, tabs, fasteners, protrusions, or the like, to engage or be received in respective pressing member coupling portion(s) 311 of the pressing member 310.

According to various embodiments, the hinge rotation limiter 332 may be formed inside the hinge cover 330. The hinge rotation limiter 332 may be formed as part of an arc. The hinge rotation limiter 332 may contact the rotor protrusion 324 of the rotor 320. The hinge rotation limiter 332 may contact the rotor projection 324 to restrict the rotation of the rotor projection 324, and thus the rotation of the rotor 320 may be restricted in a specific section.

Figure 5A:
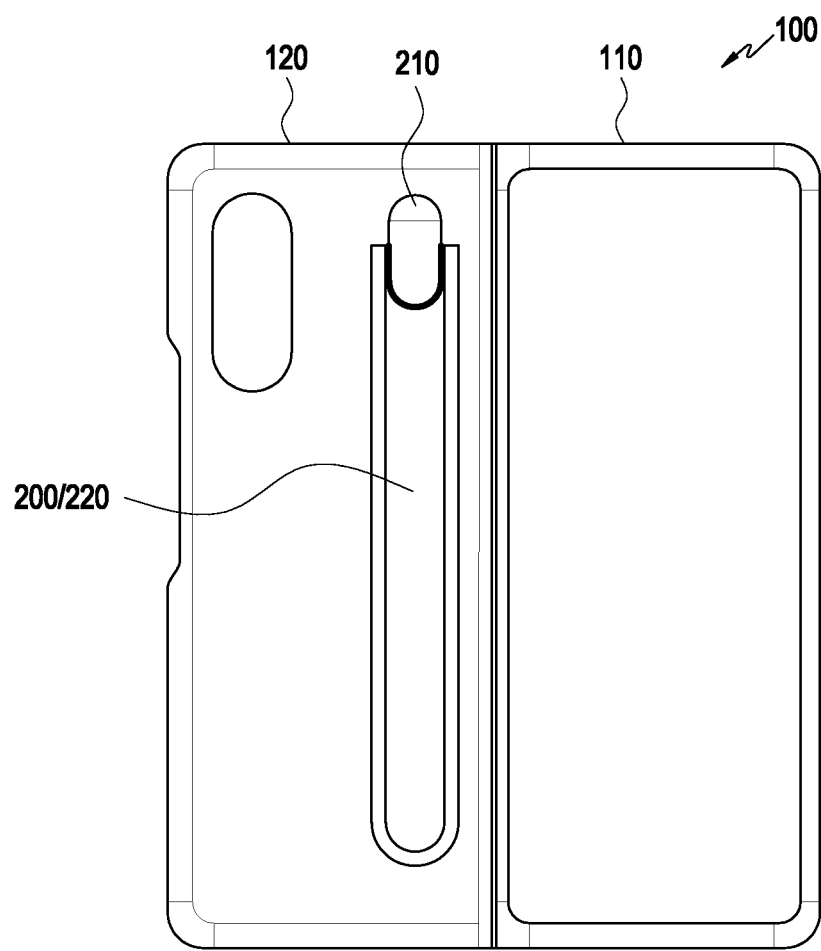
FIG. 5A is a view illustrating the rear surface of a cover in a first state according to various embodiments of the disclosure.
Figure 5B:
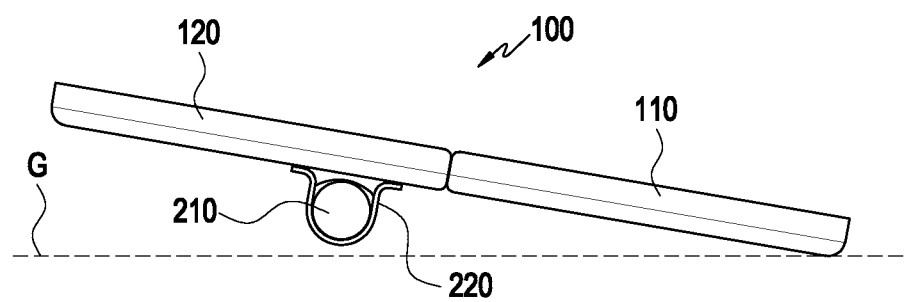
FIG. 5B is a rear view illustrating the cover in the first state, viewed from above the cover according to various embodiments of the disclosure.
Figure 5C:
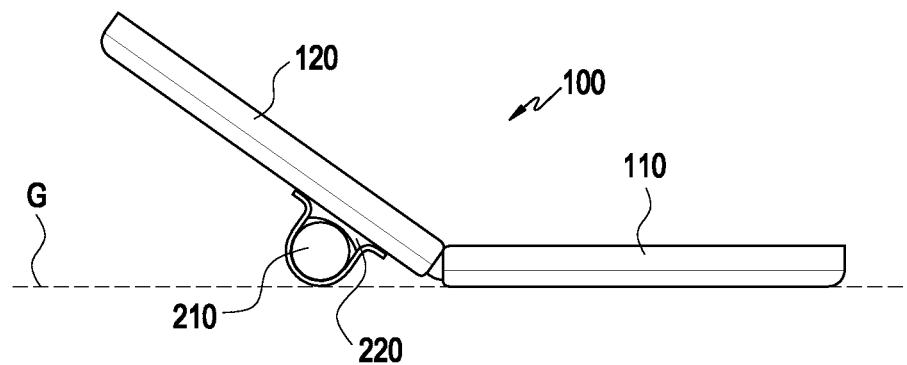
FIGS. 5C and 5D are views illustrating the cover in the first state, in which a first cover portion is at a specific angle relative to a second cover portion, viewed from above the cover according to various embodiments of the disclosure.
Figure 5D:
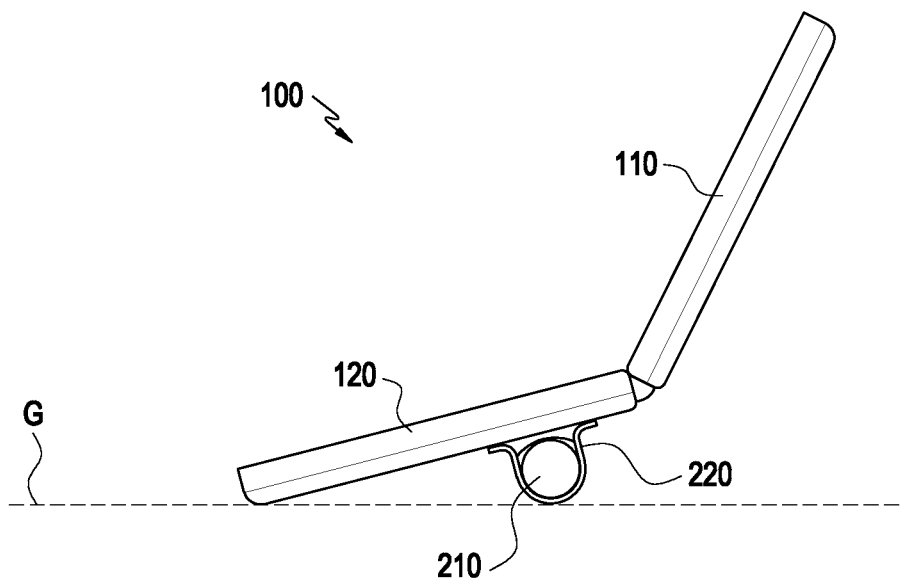

FIG. 5A is a view illustrating the rear surface of a cover 100 in a first state according to various embodiments of the disclosure, FIG. 5B is a view illustrating the cover in the first state, viewed from above the cover 100 according to various embodiments of the disclosure, and FIGS. 5C and 5D are views illustrating the cover 100 in the first state, in which a first cover portion 110 and a second cover portion 120 form a specific angle with each other, viewed from above the cover 100 according to various embodiments of the disclosure.

The cover 100, the holder 200, the pen 210, and the pouch 220 illustrated in FIGS. 5A-5D may be identical or similar to the cover 100, the holder 200, the pen 210, and the pouch 220 illustrated in FIGS. 1 to 4B. Accordingly, a redundant description of the same components may be avoided.

FIG. 5A illustrates the rear surface of the cover 100 in the first state, FIG. 5B illustrates the cover 100 in the first state, viewed from the top, and FIGS. 5C and 5D illustrate the rear surface of the cover 100 in which the first cover portion 110 is at a specific angle with the second cover portion 120, as viewed from the top.

As described before with reference to FIGS. 1 to 4B, the holder 200 may rotate with respect to the cover 100 through the hinge assembly 300.

Referring to FIGS. 5A and 5B, according to various embodiments, the longitudinal direction of the holder 200 disposed on the cover 100 may be disposed parallel to the longitudinal direction of the cover 100. A state of the cover 100 in which the longitudinal direction of the holder 200 is disposed parallel to the longitudinal direction of the cover 100 may be defined as the first state.

According to various embodiments, in the cover 100 in the first state placed on a flat ground, at least part of the holder 200 and at least part of the first cover portion 110 may contact the ground. The cover 100 in the first state may be disposed to be tilted from the ground G, shown in FIG. 5B. According to an embodiment, at least part of the second cover portion 120 may be disposed at a position farther from the ground G than at least part of the first cover portion 110 in the cover 100 in the first state, when placed on the ground G.

Referring to FIGS. 5C and 5D, according to various embodiments, the first cover portion 110 and the second cover portion 120 of the cover 100 may be configured to be adjusted to change an angle between the two covers 110, 120. In some embodiments, the angle between the covers 110, 120 may be predefined or fixed such that only a single or limited number of angles may be possible. In other embodiments, the angle between the covers 110, 120 may be fully adjustable between a flat state (e.g., FIG. 5B) and a fully closed state where front surfaces of the two covers are substantially parallel or in contact with each other. Further, in some embodiments, the angle between the first cover portion 110 and the second cover portion 120 is not limited to a specific angle, and the first cover portion 110 and the second cover portion 120 may be configured not to move at a user-desired angle. According to an embodiment, the cover 100 may be capable of free stop, and the first cover portion 110 and the second cover portion 120 may be fixed at a user-desired angle.

Referring to FIG. 5C, according to various embodiments, at least part of the first cover portion 110 may contact the ground G, at least part of the holder 200 may contact the ground G, and the second cover portion 120 may not contact the ground G.

Referring to FIG. 5D, according to various embodiments, the first cover portion 110 may not contact the ground G, at least part of the holder 200 may contact the ground G, and at least part of the second cover portion 120 may contact the ground G. Referring to FIGS. 5C and 5D, according to various embodiments, an electronic device (e.g., the electronic device 510 of FIG. 7A or the electronic device 520 of FIG. 7B) coupled with at least part of the cover 100 may be configured to detect the first state and the second state of the cover 100. According to an embodiment, the electronic device may be configured to detect the rotation of the holder 200. According to an embodiment, a magnet (not shown) may be disposed on at least part of the holder 200, and a magnetic field sensor (not shown) may be disposed on or in at least part of the electronic device. The magnetic field sensor disposed on or in the electronic device may detect a magnetic force of the magnet disposed in the holder 200 to detect the first state and the second state of the cover 100. The electronic device may detect the first state or the second state of the cover 100 and execute a specialized program according to the detected state. According to an embodiment, the electronic device may be configured to execute the specialized program only when coupled with the cover 100 provided by a manufacturer.

According to various embodiments, the pen 210 may be configured to physically contact and electrically communicate with the electronic device. As the pen 210 and the electronic device are capable of communicating with each other, the electronic device may be configured to detect the state of the pen 210.

According to various embodiments, screen rotation of the electronic device may be possible. As screen rotation is possible, the user may conveniently view the screen of the electronic device according to various embodiments. The electronic device may detect a tilted state of the electronic device, and rotate and output (e.g., display) the screen accordingly. According to an embodiment, as the electronic device detects the first state and the second state of the cover 100 through the magnetic force sensor, the electronic device may rotate and output the screen.

According to various embodiments, when the angle between the first cover portion 110 and the second cover portion 120 is maintained at a value between 0 degrees (e.g., fully closed cover portions 110, 120) and 180 degrees (e.g., fully open, as shown in FIGS. 5A-5B), the electronic device may be configured to output different content through a display (not shown) disposed in a first housing (e.g., a first housing 511 of FIG. 7A) and a display disposed in a second housing (e.g., a second housing 512 of FIG. 7A). As such, a mode in which different content is output through the display disposed in the first housing and the display disposed in the second housing as if the displays were separated from each other may be referred to as a flex mode. According to an embodiment, the display disposed in the first housing may output a keyboard, and the display disposed in the second housing may output an input value. According to another embodiment, the display disposed in the second housing may output a keyboard, and the display disposed in the first housing may output an input value. According to an embodiment, the electronic device may detect the angle between the first cover portion 110 and the second cover portion 120 maintained at a value between 0 degrees and 180 degrees in the cover 100 in the first state, and thus rotate and output a screen to the displays in the flex mode.

Figure 6A:
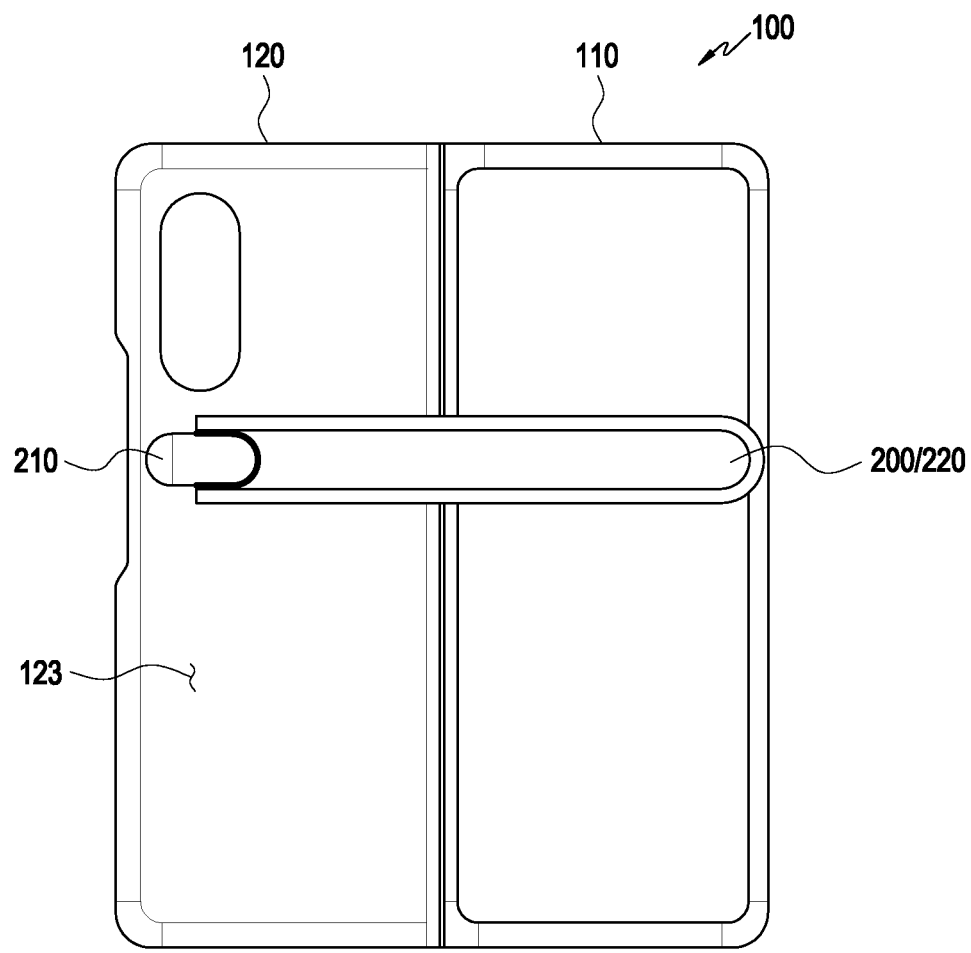
FIG. 6A is a view illustrating the rear surface of a cover in a second state according to various embodiments of the disclosure.
Figure 6B:
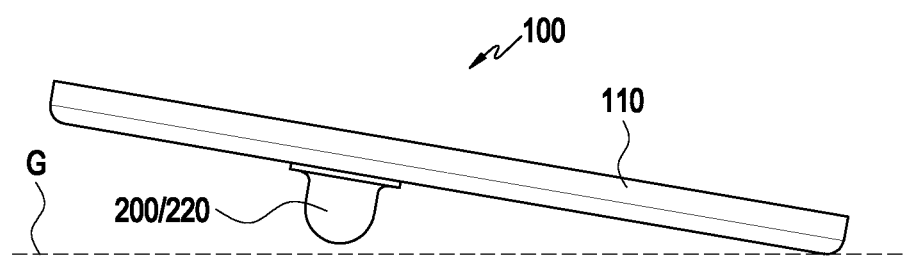
FIG. 6B is a side view illustrating the cover in the second state, according to various embodiments of the disclosure.

FIG. 6A is a bottom view illustrating the rear surface of a cover 100 in a second state according to various embodiments of the disclosure, and FIG. 6B is a side view illustrating the cover 100 in the second state and on the ground G, viewed from the side according to various embodiments of the disclosure.

The cover 100, the holder 200, the pen 210, and the pouch 220 illustrated in FIGS. 6A and 6B may be identical or similar to the cover 100, the holder 200, the pen 210, and the pouch 220 illustrated in FIGS. 1 to 4B. Accordingly, a redundant description of the same components may be avoided.

FIG. 6A illustrates the rear surface of the cover 100 with the holder 200 in the second state, and FIG. 6B is a side view illustrating the cover 100 with the holder 200 in the second state.

As described before with reference to FIGS. 1 to 4B, the holder 200 may rotate with respect to the cover 100 through the hinge assembly 300.

Referring to FIGS. 6A and 6B, according to various embodiments, the longitudinal direction of the holder 200 disposed on the cover 100 may be disposed parallel to a width direction of the cover 100. A state of the cover 100 in which the longitudinal direction of the holder 200 is disposed parallel to the width direction of the cover 100 may be defined as the second state.

According to various embodiments, at least part of the holder 200, at least part of the first cover portion 110, and at least part of the second cover portion 120 in the second state of the cover 100 placed on a flat ground may contact the ground G (e.g., as shown in FIG. 6B). The cover 100 in the second state may be disposed to be tilted from the ground G. According to an embodiment, in the second state, a lower part of the cover 100 may be in contact with the ground G, and an upper part of the cover 100 may be disposed to be spaced apart from the ground G.

According to various embodiments, the holder 200 disposed on the rear surface 123 of the cover 100 may be formed to rotate in a plane parallel with the rear surface 123. As such, as the holder 200 is formed to be rotatable, the cover 100 may be positioned to be tilted according to the user's convenience.

FIG. 7A is a perspective view illustrating a cover 100 and a foldable electronic device 510 according to various embodiments of the disclosure, and FIG. 7B is a perspective view illustrating a cover 100-1 and an electronic device 520 according to various embodiments of the disclosure.

The cover 100 and the holder 200 illustrated in FIG. 7A may be identical or similar to the cover 100 and the holder 200 illustrated in FIGS. 1 to 6B. Accordingly, a redundant description of the same components may be avoided.

According to various embodiments, the cover 100 may be formed to accommodate a foldable electronic device 510. As such, the foldable electronic device 510 may be housed or secured within the cover 100, and portions of the cover 100 may move with respective portions of the foldable electronic device 510. That is, for example, as the foldable electronic device 510 is folded, the cover 100 may move by following the movement of the foldable electronic device 510. According to an embodiment, the holder 200 is disposed on the rear surface 123 of the cover 100 and may be formed to rotate in a plane parallel with the rear surface 123. Accordingly, the electronic device 510 may be positioned on a surface (e.g., ground) to be tilted according to the user's convenience.

According to various embodiments, the electronic device 510 may include a first housing 511 and a second housing 512. The first housing 511 may be coupled with the first cover portion 110 of the cover 100, and the second housing 512 may be coupled with the second cover portion 120 of the cover 100. The electronic device 510 may include a hinge 513 disposed between the first housing 511 and the second housing 512, and the second housing 512 may rotate with respect to the first housing 511 according to the rotation of the hinge 513. The electronic device 510 may include a display disposed in the first housing 511, a display disposed in the second housing 512, and a display disposed on the hinge. The display disposed in the first housing 511, the display disposed in the second housing 512, and the display disposed on the hinge may be configured integrally or separately. That is, in some embodiments, a display or screen may span an entire front face (not shown) of the electronic device 510. In some embodiments, a rear surface 514 of the first housing 511 may include or define a screen or display which may be visible through a first opening 112 of the first cover portion 110. A camera module 515, of the electronic device 510, on the second housing 512 may be visible or accessible through a second opening 122, similar to that described above.

Referring FIG. 7B, the holder 200 and pen 210 illustrated in FIG. 7B may be identical or similar to the holder 200 and pen 210 disclosed in FIGS. 1 to 6B. Accordingly, a redundant description of the same components may be avoided.

According to various embodiments, a cover 100-1 may be formed to accommodate an electronic device 520. According to an embodiment, the holder 200 disposed on a rear surface 123-1 of the cover 100-1 may be formed to rotate in a plane parallel with the rear surface 123-1. Accordingly, the electronic device 520 may be positioned to be tilted according to the user's convenience. It will be appreciated that the electronic device 520 is a single portion/housing/panel configuration (i.e., not foldable). As such, no second housing or second cover portion is present in this configuration. However, the holder 200 is rotatably attached to the cover 100-1 and provides the same or similar functionality as the holders described above.

When the user uses the multimedia function for a long time using the electronic device, the user has to watch a video while holding the electronic device in his or her hand, which causes inconvenience to the user.

Moreover, when the user applies an input to the electronic device with another tool, a space for accommodating the tool therein may be required in the electronic device. However, when the tool is accommodated in the electronic device, the size of the electronic device increases, which may cause inconvenience to the user.

Accordingly, a configuration that enables the user to use the electronic device without holding the electronic device in the user's hand is required, and a space for accommodating another tool capable of transmitting an input signal to the electronic device is required.

Various embodiments of the disclosure may provide a cover to fix an electronic device without any special contact with the electronic device and accommodate a tool that enables an input to the electronic device, when a user uses the electronic device.

According to various embodiments of the disclosure, as an electronic device cover accommodates various components, user convenience may increase.

According to various embodiments of the disclosure, as the electronic device cover enables a user to easily grip an electronic device, the user convenience may increase.

According to various embodiments of the disclosure, the user may position the electronic device to be tilted for convenience by using the electronic device cover.

According to various embodiments of the disclosure, the electronic device is positioned at a user-desired position with the use of the electronic device cover. Accordingly, the user may conveniently view a video or an image output from the electronic device.

An electronic device cover (e.g., the cover 100 of FIG. 1) according to various embodiments of the disclosure may include a first cover portion (e.g., the first cover portion 110 of FIG. 1), a second cover portion (e.g., the second cover portion 120 of FIG. 1) formed to be movable relative to the first cover portion, a hinge assembly (e.g., the hinge assembly 300 of FIG. 2A) disposed on one surface of the second cover portion, and a holder (e.g., the holder 200 of FIG. 1) rotatably coupled to the hinge assembly. A rotation center of the holder may be disposed between ends of the holder, and the holder may be formed to rotate in a plane parallel with the surface of the second cover portion.

According to various embodiments, the holder may provide a first state in which the holder is disposed to be parallel to a longitudinal direction of the electronic device cover, and a second state in which the holder is disposed perpendicular to the longitudinal direction of the electronic device cover.

According to various embodiments, the hinge assembly may include a rotor (e.g., the rotor 320 of FIG. 2B) formed to be coupled with the holder, a hinge cover (e.g., the hinge cover 330 of FIG. 2B) disposed about the rotor and covering the rotor, and a pressing member (e.g., the pressing member 310 of FIG. 2B) formed to press and apply force to the rotor and to be coupled with the second cover portion.

According to various embodiments, the rotor may include at least one rotor pressing groove (e.g., the rotor pressing groove 323 of FIG. 4A), and the pressing member includes a pressing member pressing protrusion (e.g., the pressing member pressing protrusion 313 of FIG. 4B) pressing the rotor pressing groove.

According to various embodiments, the rotor may include a rotor protrusion (e.g., the rotor protrusion 324 of FIG. 4B) formed at at least part of the rotor, and the hinge cover may include a hinge rotation limiter (e.g., the hinge rotation limiter 332 of FIG. 4B) formed to restrict movement of the rotor protrusion.

According to various embodiments, the hinge assembly may include at least one hinge cover coupling portion (e.g., the hinge cover coupling portion 331 of FIG. 4A) formed to pass through the pressing member and be fixed to the second cover portion.

According to various embodiments, the holder may include a pouch (e.g., the pouch 220 of FIG. 2B) and a base fixer (e.g., the base fixer 230 of FIG. 2B).

According to various embodiments, the rotor may include at least one rotor coupling member (e.g., the rotor coupling member 321 of FIG. 4A) formed to pass through the base fixer and be fixed in a rotor coupling groove formed in the rotor.

According to various embodiments, the pouch may be coupled with the base fixer.

According to various embodiments, the holder may further include a pen (e.g., the pen 210 of FIG. 2B), and may be formed to accommodate the pen.

According to various embodiments, the holder may be formed in a shape of a clip.

According to various embodiments, the holder may be formed as a suction pad.

According to various embodiments, the holder may be formed as a hand strap.

According to various embodiments of the disclosure, an electronic device (e.g., the electronic device 510 of FIG. 7A) including a first housing (e.g., the first housing 511 of FIG. 7A), a second housing (e.g., the second housing 512 of FIG. 7A), a hinge (e.g., hinge 513 of FIG. 7A), and a display disposed across the first housing, the second housing, and the hinge may be coupled with an electronic device cover (e.g., the cover 100 of FIG. 1). The electronic device cover may include a first cover portion (e.g., the first cover portion 110 of FIG. 1) coupled with the first housing, a second cover portion (e.g., the second cover portion 120 of FIG. 1) coupled with the second housing and formed to be movable relative to the first cover portion, a hinge assembly (e.g., the hinge assembly 300 of FIG. 2A) disposed on one surface of the second cover portion, and a holder (e.g., the holder 200 of FIG. 1) rotatably coupled to the hinge assembly. A rotation center of the holder may be disposed between ends of the holder, and the holder may be formed to rotate in a plane parallel with the surface of the second cover portion.

According to various embodiments of the disclosure, an electronic device cover (e.g., the cover 100-1 of FIG. 7B) may include a hinge assembly (e.g., the hinge assembly 300 of FIG. 2A) disposed on one surface of the electronic device cover, and a holder (e.g., the holder 200 of FIG. 1) rotatably coupled to the hinge assembly. A rotation center of the holder may be disposed between ends of the holder, and the holder may be formed to rotate in a plane parallel with the surface of the electronic device cover.

According to various embodiments, the holder may provide a first state in which the holder is disposed to be parallel to a longitudinal direction of the electronic device cover and a second state in which the holder is disposed perpendicular to the longitudinal direction of the electronic device cover.

According to various embodiments, the hinge assembly may include a rotor (e.g., the rotor 320 of FIG. 2B) formed to be coupled with the holder, a hinge cover (e.g., the hinge cover 330 of FIG. 2B) disposed about the rotor and covering the rotor, and a pressing member (e.g., the pressing member 310 of FIG. 2B) formed to press and apply force to the rotor and to be coupled with the hinge cover.

According to various embodiments, the rotor may include at least one rotor pressing groove (e.g., the rotor pressing groove 323 of FIG. 4A), and the pressing member may include a pressing member pressing protrusion (e.g., the pressing member pressing protrusion 313 of FIG. 4B) pressing the rotor pressing groove.

According to various embodiments, the rotor may include a rotor protrusion (e.g., the rotor protrusion 324 of FIG. 4B) formed at at least part of the rotor, and the hinge cover may include a hinge rotation limiter (e.g., the hinge rotation limiter 332 of FIG. 4B) formed to restrict movement of the rotor protrusion.

According to various embodiments, the hinge assembly may include at least one hinge cover coupling portion (e.g., the hinge cover coupling portion 331 of FIG. 4A) formed to pass through the pressing member and be fixed to the electronic device cover.

While specific embodiments have been described above, it will be apparent to those skilled in the art that many modifications can be made within the scope of the disclosure.

What is claimed is:

1. An electronic device cover for containing an electronic device, the electronic device cover comprising:
a first cover portion;
a second cover portion formed to be movable relative to the first cover portion;
a hinge assembly disposed on a surface of the second cover portion;
a pen configured to contact and electrically communicate with the electronic device; and
a holder formed to accommodate the pen and rotatably coupled to the hinge assembly, the holder having a first end and a second end,
wherein a rotation center of the holder is disposed between the first end and the second end of the holder, and
wherein the holder is formed to rotate in a plane parallel with the surface of the second cover portion so that the electronic device is placed in a first state in which the holder and the first cover are in contact on a flat ground or the holder and the second cover are in contact on the flat ground, and a second state in which the holder, the first cover and the second cover are in contact on the flat ground.

2. The electronic device cover of claim 1, wherein the holder is disposed to be parallel to a longitudinal direction of the electronic device cover in the first state, and the holder is disposed perpendicular to the longitudinal direction of the electronic device cover in the second state.

3. The electronic device cover of claim 1, wherein the hinge assembly includes a rotor formed to be coupled with the holder, a hinge cover disposed about the rotor and covering the rotor, and a pressing member formed to apply force to the rotor and to be coupled with the second cover portion.

4. The electronic device cover of claim 3, wherein the rotor includes at least one rotor pressing groove, and the pressing member includes a pressing member pressing protrusion pressing the rotor pressing groove.

5. The electronic device cover of claim 3, wherein the rotor includes a rotor protrusion formed on at at least part of the rotor, and the hinge cover includes a hinge rotation limiter formed to restrict movement of the rotor protrusion.

6. The electronic device cover of claim 3, wherein the hinge assembly includes at least one hinge cover coupling portion formed to pass through the pressing member and be fixed to the second cover portion.

7. The electronic device cover of claim 3, wherein the holder includes a pouch and a base fixer.

8. The electronic device cover of claim 7, wherein the rotor includes at least one rotor coupling member formed to pass through the base fixer and be fixed in a rotor coupling groove formed in the rotor.

9. The electronic device cover of claim 7, wherein the pouch is coupled with the base fixer.

10. An electronic device assembly comprising:
an electronic device comprising a first housing, a second housing, a hinge, and a display disposed across the first housing, the second housing, and the hinge, wherein the first housing is formed to be moveable relative to the second housing about the hinge; and an electronic device cover coupled with the electronic device, the electronic device cover comprising:

a first cover portion coupled with the first housing;

a second cover portion coupled with the second housing and formed to be movable relative to the first cover portion;

a hinge assembly disposed on one surface of the second cover portion;

a pen configured to contact and electrically communicate with the electronic device; and a holder formed to accommodate the pen and rotatably coupled to the hinge assembly, the holder having a first end and a second end, wherein a rotation center of the holder is disposed between the first end and the second end of the holder, and wherein the holder is formed to rotate in a plane parallel with the surface of the second cover portion so that the electronic device is placed in a first state in which the holder and the first cover are in contact on a flat ground or the holder and the second cover are in contact on the flat ground, and a second state in which the holder, the first cover and the second cover are in contact on the flat ground.

\* \* \* \* \*